US012608978B2

(12) United States Patent
Han et al.

(10) Patent No.: US 12,608,978 B2
(45) Date of Patent: Apr. 21, 2026

(54) EMOTION RECOGNITION METHOD AND APPARATUS BASED ON CONTEXT INFORMATION

(71) Applicant: ELECTRONICS AND TELECOMMUNICATIONS RESEARCH INSTITUTE, Daejeon (KR)

(72) Inventors: Byung-Ok Han, Daejeon (KR); Moon-Ki Back, Daejeon (KR); Jang-Hee Yoo, Daejeon (KR); Cheol-Hwan Yoo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 237 days.

(21) Appl. No.: 18/502,336

(22) Filed: Nov. 6, 2023

(65) Prior Publication Data

US 2025/0078568 A1    Mar. 6, 2025

(30) Foreign Application Priority Data

Sep. 5, 2023    (KR) ........................ 10-2023-0117894

(51) Int. Cl.
G06V 40/16 (2022.01)
(52) U.S. Cl.
CPC .................................. G06V 40/174 (2022.01)
(58) Field of Classification Search
CPC .... G06V 40/174; G06V 10/82; G06V 10/811;
G06V 20/52; G06V 40/23; G06F 40/30;
G10L 25/63
See application file for complete search history.

(56) References Cited

U.S. PATENT DOCUMENTS

| | | | |
|---|---|---|---|
| 10,013,977 B2 | 7/2018 | Fu | |
| 2014/0112556 A1* | 4/2014 | Kalinli-Akbacak | ........................ G06V 40/176 382/128 |
| 2019/0228215 A1* | 7/2019 | Najafirad | ................ G06F 3/013 |
| 2019/0325728 A1 | 10/2019 | Kim et al. | |
| 2021/0019640 A1 | 1/2021 | Kim et al. | |

(Continued)

FOREIGN PATENT DOCUMENTS

| | | |
|---|---|---|
| KR | 10-2351008 B1 | 1/2022 |
| KR | 10-2398683 B1 | 5/2022 |

OTHER PUBLICATIONS

Cai et al., "Multi-Modal Emotion Recognition From Speech and Facial Expression Based on Deep Learning," 2020. (Year: 2020).*

(Continued)

*Primary Examiner* — Phuoc Tran
(74) *Attorney, Agent, or Firm* — LRK PATENT LAW FIRM

(57) ABSTRACT

Disclosed herein are an emotion recognition method and method based on context information. The emotion recognition method includes detecting information corresponding to an emotion recognition subject from an input image, extracting a recognition subject feature based on the information corresponding to the emotion recognition subject, extracting a context feature based on the input image, storing the recognition subject feature and the context feature in a short-term memory, and storing the context feature in a long-term memory.

10 Claims, 5 Drawing Sheets

(56) References Cited

U.S. PATENT DOCUMENTS

2021/0390288 A1* 12/2021 Mittal ................... G06V 10/82
2023/0237844 A1* 7/2023 Chang ................. G06V 40/174
                                                              382/103
2024/0404161 A1* 12/2024 Bosnak .................. G06F 40/30
2025/0284732 A1* 9/2025 O'Neill ................ G06F 16/483

OTHER PUBLICATIONS

Dou Hu et al. "DialogueCRN: Contextual Reasoning Networks for Emotion Recognition in Conversations", arXiv:2106.01978v2 [cs. CL] Jun. 9, 2021.
Navonil Majumder et al., "DialogueRNN: An Attentive RNN for Emotion Detection in Conversations", arXiv:1811.00405v4 [cs.CL] May 25, 2019.

* cited by examiner

EMOTION RECOGNITION METHOD AND APPARATUS BASED ON CONTEXT INFORMATION

CROSS REFERENCE TO RELATED APPLICATION

This application claims the benefit of Korean Patent Application No. 10-2023-0117894, filed Sep. 5, 2023, which is hereby incorporated by reference in its entirety into this application.

BACKGROUND OF THE INVENTION

1. Technical Field

The present disclosure relates generally to technology for estimating the emotion of a person by analyzing an input image.

More particularly, the present disclosure relates to technology for estimating the emotion of a person within an input image based on an artificial intelligence neural network.

More particularly, the present disclosure relates to technology for estimating the emotion of a person within an input image using context information included in the input image.

2. Description of Related Art

An image-based automated emotion recognition method observes/analyzes a user's voluntary outward expressions to analyze and infer the user's emotions, which are hidden internal states.

Conventional automated emotion recognition methods primarily focus on extracting facial expressions/behavior/tone of voice/language features by analyzing the user's image (video)/audio data and on determining emotions by training a deep neural network (DNN) together with relevant emotion annotation information in order to accurately determine the user's internal emotional state. However, to accurately understand a person's emotions, not only the user's outward expression features (facial expressions/behavior/tone of voice/language) but also the spatiotemporal context features related to the user (person) need to be taken into consideration. For example, when returning to the office on Monday after a weekend break, people's expressions may be gloomy, and thus periodic context information may be required. The emotional states of patients in hospitals may have characteristics different from those of persons in other indoor areas. Generally, when discerning emotions of others, people consider such spatiotemporal context to estimate the emotions.

The present disclosure relates to a context-aware emotion recognition method based on long-term/short-term memory, which accurately understands the complicated internal emotional states of each person. In order to consider temporal contexts, long-term/short-term emotion memory features are stored in memory, and when necessary, integrated analysis is conducted along with the user's emotion feature information to perform emotion recognition.

PRIOR ART DOCUMENTS

Patent Documents (Patent Document 1) Korean Patent No. 10-2398683 (Title: System and Method for Constructing Emotion Lexicon by Paraphrasing and Recognizing Emotion Frames)

SUMMARY OF THE INVENTION

Accordingly, the present disclosure has been made keeping in mind the above problems occurring in the prior art, and an object of the present disclosure is to provide the result of more accurate emotion recognition through context-aware emotion recognition.

Another object of the present disclosure is to efficiently store context information by utilizing long-term/short-term memory and to perform emotion recognition using the stored information.

In accordance with an aspect of the present disclosure to accomplish the above objects, there is provided an emotion recognition method based on context information in a context-aware emotion recognition method based on long-term/short-term memory performed by an emotion recognition apparatus, the emotion recognition method including detecting information corresponding to an emotion recognition subject from an input image; extracting a recognition subject feature based on the information corresponding to the emotion recognition subject; extracting a context feature based on the input image; storing the recognition subject feature and the context feature in a short-term memory; and storing the context feature in a long-term memory.

The long-term memory may store context text information generated based on the context feature.

The emotion recognition method may further include recognizing an emotion of the emotion recognition subject based on the information stored in the short-term memory and the long-term memory.

Recognizing the emotion may include recognizing the emotion based on summary context information that is generated using the context text information, stored in the long-term memory, as input.

The context text information may be generated by inputting the context feature to a pre-trained language model.

The information corresponding to the emotion recognition subject may include a face region of the emotion recognition subject, a full-body region of the emotion recognition subject, and voice of the emotion recognition subject.

The short-term memory may store the recognition subject feature and the context feature at a first frequency for all frames of the input image.

The long-term memory may store the context text information at a second frequency lower than the first frequency for all frames of the input image.

In accordance with another aspect of the present disclosure to accomplish the above objects, there is provided an emotion recognition apparatus based on context information, including a subject detection unit configured to detect information corresponding to an emotion recognition subject from an input image; a subject feature extraction unit configured to extract a recognition subject feature based on the information corresponding to the emotion recognition subject; a context feature extraction unit configured to extract a context feature based on the input image; a short-term storage unit configured to store the recognition subject feature and the context feature; and a long-term storage unit configured to store the context feature.

The long-term storage unit may store context text information generated based on the context feature.

The emotion recognition apparatus may further include an emotion recognition unit configured to recognize an emotion of the emotion recognition subject based on the information stored in the short-term storage unit and the long-term storage unit.

The emotion recognition unit may recognize the emotion based on summary context information that is generated using the context text information, stored in the long-term storage unit, as input.

The context text information may be generated by inputting the context feature to a pre-trained language model.

The information corresponding to the emotion recognition subject may include a face region of the emotion recognition subject, a full-body region of the emotion recognition subject, and voice of the emotion recognition subject.

The short-term storage unit may store the recognition subject feature and the context feature at a first frequency for all frames of the input image.

The long-term storage unit may store the context text information at a second frequency lower than the first frequency for all frames of the input image.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
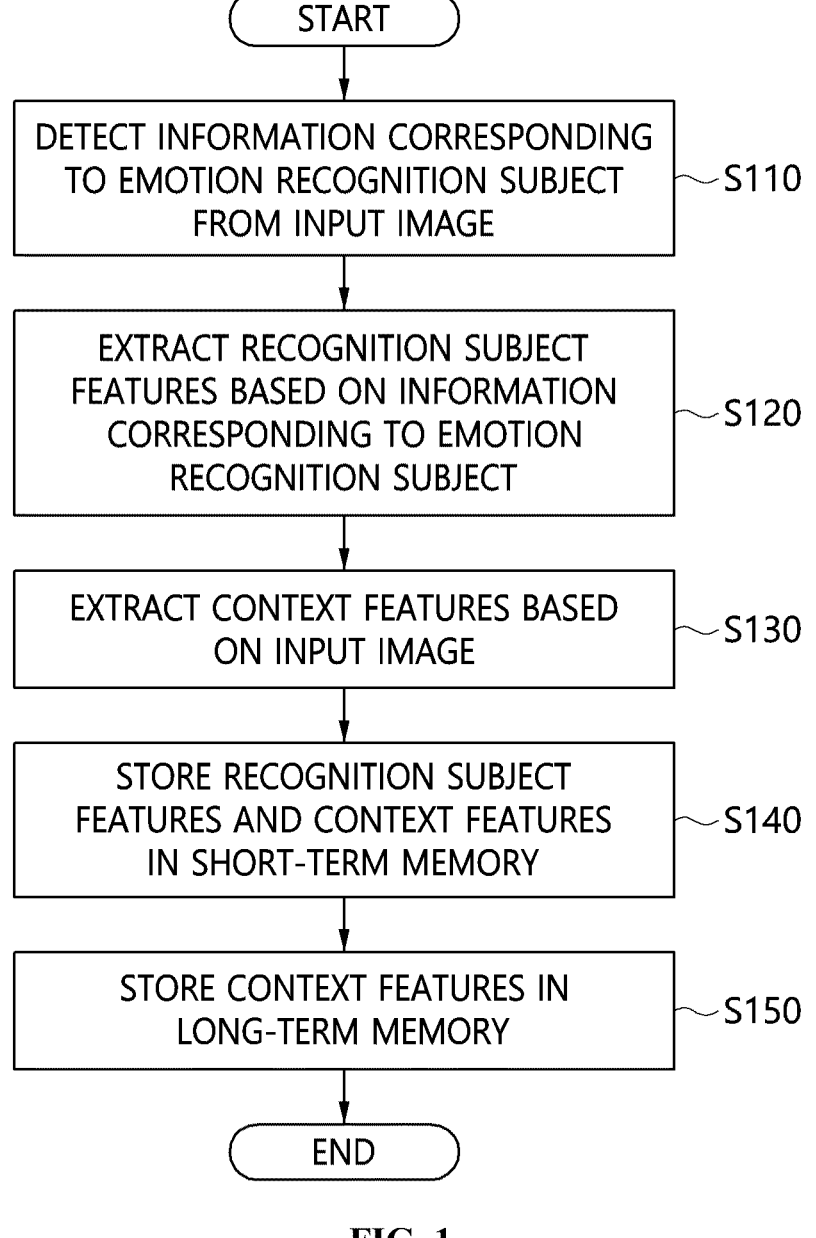
FIG. 1 is a flowchart illustrating an emotion recognition method based on context information according to an embodiment of the present disclosure.

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

Hereinafter, embodiments of the present disclosure will be described in detail with reference to the accompanying drawings. In the following description of the present disclosure, the same reference numerals are used to designate the same or similar elements throughout the drawings and repeated descriptions of the same components will be omitted.

The present disclosure relates to a system for inferring the emotions of a user in an integrated manner based on information such as spatiotemporal context information and the facial expression/behavior of the user by utilizing the long-term/short-term memory so as to analyze and infer the emotions of the user.

The present disclosure may be operated on camera equipment such as a Closed Circuit Television (CCTV) which is capable of capturing RGB images in real time, and a computer which can analyze images from the corresponding equipment in real time. The computer may include volatile memory such as Random Access Memory (RAM) in which short-term emotional information, generated during which a program is executed, is to be stored, and nonvolatile storage such as a hard disk in which long-term emotional information is to be stored by the program.

The present disclosure may be utilized in applications requiring the observation of long-term emotional states, such as long-term emotion monitoring of elderly individuals, long-term emotion monitoring of patients, VIP customer emotion monitoring in department stores, and emotion monitoring systems by restaurant service robots that serve membership guests.

In this case, the present disclosure is characterized by the separate configuration of long-term memory and short-term memory for consideration of temporal contexts, the configuration related to the utilization of a vision model (VM) and a language model (LM) required for effective combination of spatiotemporal emotional context features, and the configuration related to the utilization of LM required for efficient text storage/logging/summarization (compression)/extraction of long-term emotional context features.

FIG. 1 is a flowchart illustrating an emotion recognition method based on context information according to an embodiment of the present disclosure.

The emotion recognition method based on context information according to an embodiment of the present disclosure may be performed by an emotion recognition apparatus, such as a computing device.

Referring to FIG. 1, the emotion recognition method based on context information according to the embodiment of the present disclosure may include step S110 of detecting information corresponding to an emotion recognition subject (target) from an input image, step S120 of extracting recognition subject features based on the information corresponding to the emotion recognition subject, step S130 of extracting context features based on the input image, step S140 of storing the recognition subject features and the context features in short-term memory, and step S150 of storing the context features in long-term memory.

Here, the long-term memory may store context text information generated based on the context features.

Here, although not in illustrated in FIG. 1, the method may further include the step of recognizing the emotion of the emotion recognition subject based on the information stored in the short-term memory and the long-term memory.

Here, the step of recognizing the emotion may include recognizing the emotion using summary context information, which is generated using the context text information stored in the long-term memory, as input.

Here, the context text information may be generated by inputting the context features to a pre-trained language model.

Here, the information corresponding to the emotion recognition subject may include the face region of the emotion recognition subject, the full-body region of the emotion recognition subject, and the voice (speech) of the emotion recognition subject.

Here, the short-term memory may store the recognition subject features and the context features at a first frequency for all frames of the input image.

Here, the long-term memory may store the context text information at a second frequency lower than the first frequency for all frames of the input image.

Figure 2:
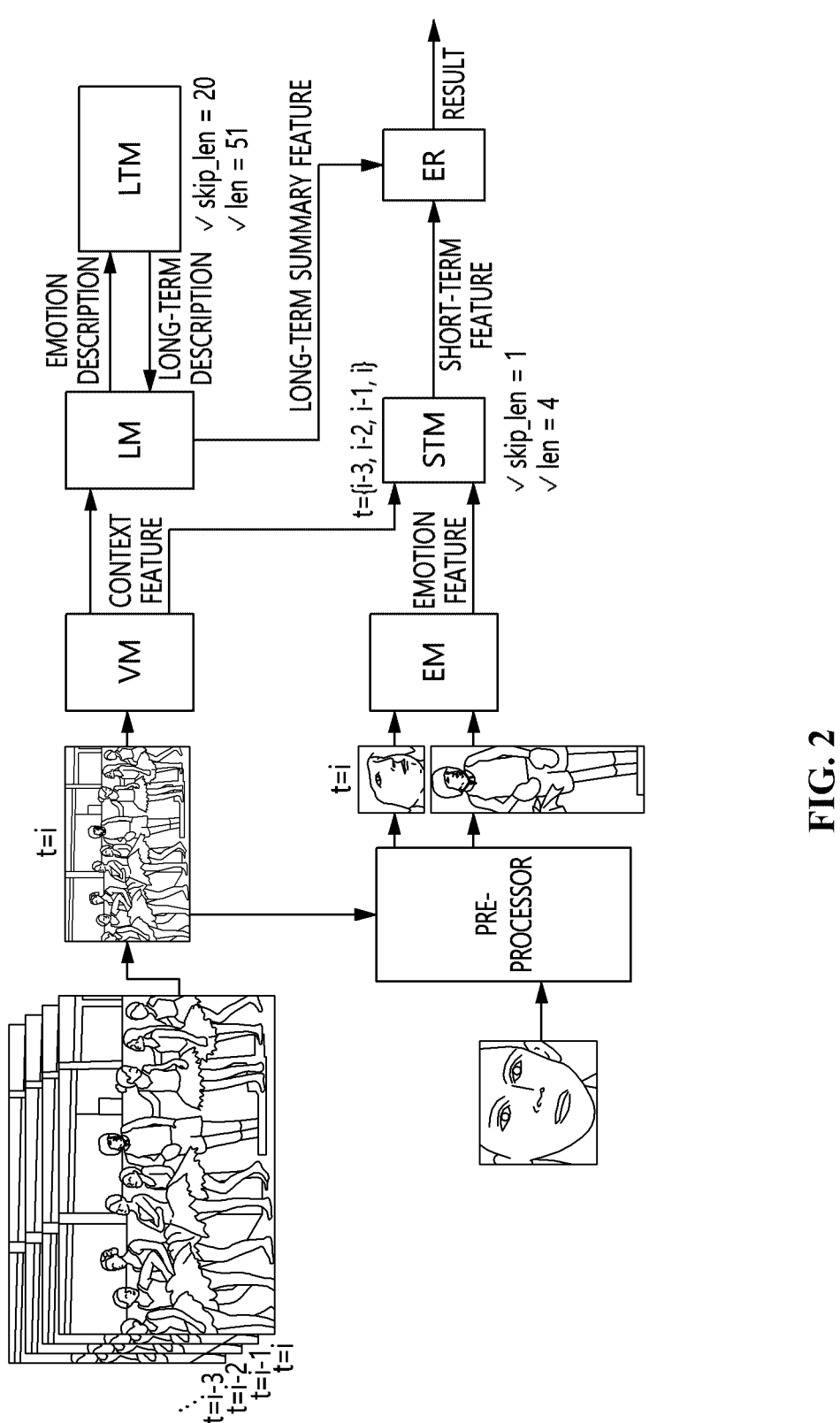
FIG. 2 is a configuration diagram of an emotion recognition system based on context information according to an embodiment of the present disclosure.

FIG. 2 is a configuration diagram of an emotion recognition system based on context information according to an embodiment of the present disclosure.

VM, EM, LM, LTM, STM, and ER described in FIG. 2 may refer to a vision model, an emotion model, a language model, long-term memory, short-term memory, and an emotion recognizer, respectively. Further, each model may correspond to an Artificial Intelligence (AI) neural network, but the scope of the present disclosure is not limited thereto.

Referring to FIG. 2, the emotion recognition system (also referred to as "emotion recognition apparatus") based on context information according to the embodiment of the present disclosure may receive one frame of a video captured in real time and the facial image (still image) of the subject to be analyzed. The real-time captured video is input to the system for each frame, and the facial image of a user is required for finding the subject whose emotion is to be analyzed in the real-time captured video.

Figure 3:
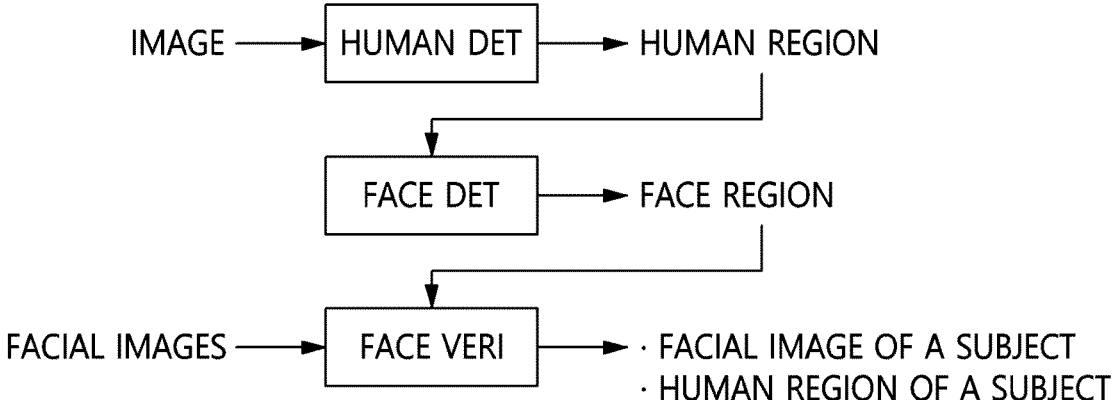
FIG. 3 illustrates an example of the configuration of a preprocessor.

FIG. 3 illustrates an example of the configuration of a preprocessor.

The preprocessor of FIG. 2 is intended to perform preprocessing required for utilizing input information. Referring to FIG. 3, in the method according to the embodiment of the present disclosure, the preprocessor may detect the face region and the full-body area (human region) of a user through full-body detection (human detection), face detection, and identification within an image. In an embodiment, only the voice information of the user may be extracted by performing speaker separation/recognition so that the voice information of the user is usable. Further, the preprocessor may perform text information extraction to extract meanings, and may further perform input preprocessing based on modality.

In this case, the emotion model (EM) is a model for extracting the outward emotion features of the user based on the result received from the preprocessor. The emotion model (EM) may be a multi-task model, and may function to extract various types of inputs as emotion features.

In an embodiment, the emotion model (EM) may receive a facial expression image and a full-body behavior image as input, and may convert the received images into emotion features. In a further embodiment, the emotion model (EM) may also convert the voice/language information of the user into emotion features. The facial expression/full-body behavior/voice/language, etc. may be used in combination, and additional information that is capable of directly representing the emotions of the user may also be input.

Figure 4:
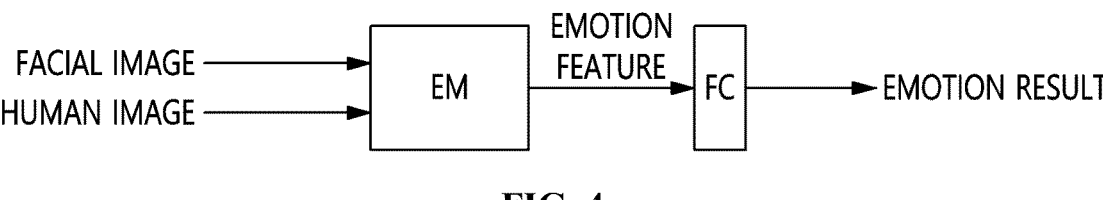
FIG. 4 illustrates an embodiment of training of an emotion model (EM)

FIG. 4 illustrates an embodiment of training of an emotion model (EM).

Referring to FIG. 4, when the emotion model is trained with a facial expression image (facial image) and a full-body behavior image (human image), a Fully-Connected (FC) layer for deriving results may be attached to the emotion model, thus training the emotion model based on a pair of an input image and an emotion annotation. After training, after the FC may be detached, the emotion model may be utilized. The emotion model (EM) may be trained in the same manner even when other modalities (voice and language) are utilized. The emotion model (EM) may use a feature extractor, which learns emotion results from various types of input modalities, without change even though separate learning is not performed.

A vision model (VM) may function to extract the features of the entire image by receiving one frame captured in real time. That is, the vision model (VM) may function to extract spatial context features indicating space information, a relationship between the user and another person in the corresponding image, a situation, etc. A language model (LM) functions to represent image features by text, and also functions to describe the image as text by utilizing the image features received from the vision model (VM).

Figure 5:
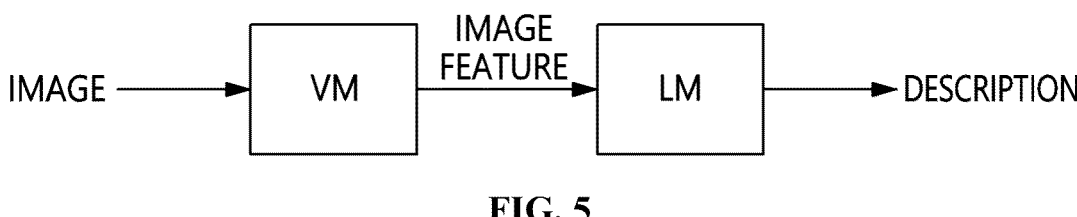
FIG. 5 illustrates an embodiment of training of a vision model (VM) and a language model (LM)

FIG. 5 illustrates an embodiment of training of a vision model (VM) and a language model (LM).

Referring to FIG. 5, the vision model (VM) and the language model (LM) may be trained based on a task such as image captioning, as illustrated in FIG. 5. Features indicating context information in an image obtained from the trained vision model (VM) may be extracted, and text describing the image may be extracted through the language model (LM). The vision model (VM) and the language model (LM) may be implemented using a pre-trained image captioning model.

Short-term memory (STM) stores context features (image features of FIG. 5) extracted from the vision model (VM) and emotion features of the emotion model (EM). The short-term memory (STM) may designate a period for short-term memory (e.g., the number of frames, a period length (len)) depending on user parameters and a skip period (skip_len) for preventing an excessively large amount of information from being duplicated. That is, when a current frame=i, skip_len=1, and len=4, context features and emotion features of an i–3-th frame, an i–2-th frame, an i–1-th frame, and an i-th frame are stored in the short-term memory (STM). The short-term memory (STM) stores data in RAM or the like, which is volatile memory. That is, the short-term memory (STM) stores emotion features for respective frames based on user parameters (e.g., skip_len, len, etc.) while the program is executed, and is initialized when the program is terminated.

Unlike the short-term memory (STM), the long-term memory (LTM) stores emotion-description texts, extracted from the vision model-language model (VM-LM), in non-volatile storage (e.g., HDD). In order to store the context features on a daily/monthly/yearly basis in the long-term, the size of the storage space of the computer on which the program is to be executed needs to be considered. In order to suitably represent context information appearing on the image and efficiently set the size of the storage device, sentences describing the context of the image are stored in the form of a sentence or a paragraph for each frame. When the sentences describing the image are stored, the following advantages may be obtained.

Because the image is represented by text, the effect of compressing the storage space may be obtained by representing emotion context information for each frame on a daily/monthly/yearly basis by semantic elements. Further, because a language may be utilized similar to emotion context information memorized by each person in the long-term, it is possible to represent long-term emotion memory. Furthermore, because the context information is stored in the form of text, emotional information logs of the user may be easily checked. Furthermore, when temporal context information is utilized by loading long-term memorized emotional sentences, summary features composed of pieces of important information may be extracted using the language model (LM).

Similar to the short-term memory (STM), the long-term memory (LTM) may determine the density and amount of context information to be stored by designating the period (len) for long-term memory and a skip period (skip_len) depending on the user parameters. For example, when skip_len=20, len=51, and current frame=i, sentences describing the images corresponding to i–1000-th, i–980-th, . . . , i–40-th, i–20-th, and i-th frames are stored in the long-term memory (LTM). The text information in which temporal contexts are stored for each frame is extracted from the long-term memory (LTM) when emotion recognition is performed. In this case, features obtained by summarizing only principal information as in the case of a person, are utilized rather than all of long-term text information being utilized. This process is achieved by the document summary task of the language model (LM).

Figure 6:
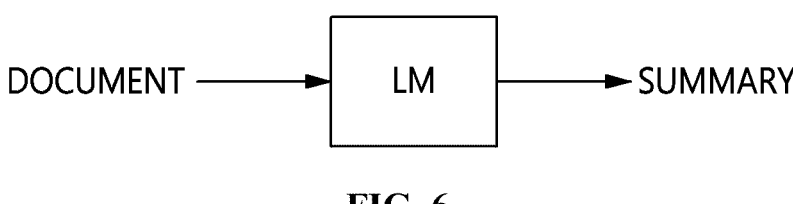
FIG. 6 illustrates a method for training a language model (LM) through a document summary task.

FIG. 6 illustrates a method for training a language model (LM) through a document summary task.

As the language model (LM), a pre-trained model which learns a document summary task may be utilized. The language model (LM) needs to be able to process a task of representing image features received from the vision model (VM) by text and a task of summarizing a document. As one embodiment of the language model (LM), a Deep Neural Network (DNN) having two heads so as to output two results through multi-task training may be utilized.

Long-term memory text information extracted from the long-term memory (LTM) is summarized as long-term summary features through the language model (LM). The summarized long-term summary features are input, together the short-term features of the short-term memory (STM), to an emotion recognizer (ER), which is the final stage, and the emotion recognizer (ER) infers a final emotional state.

Figure 7:
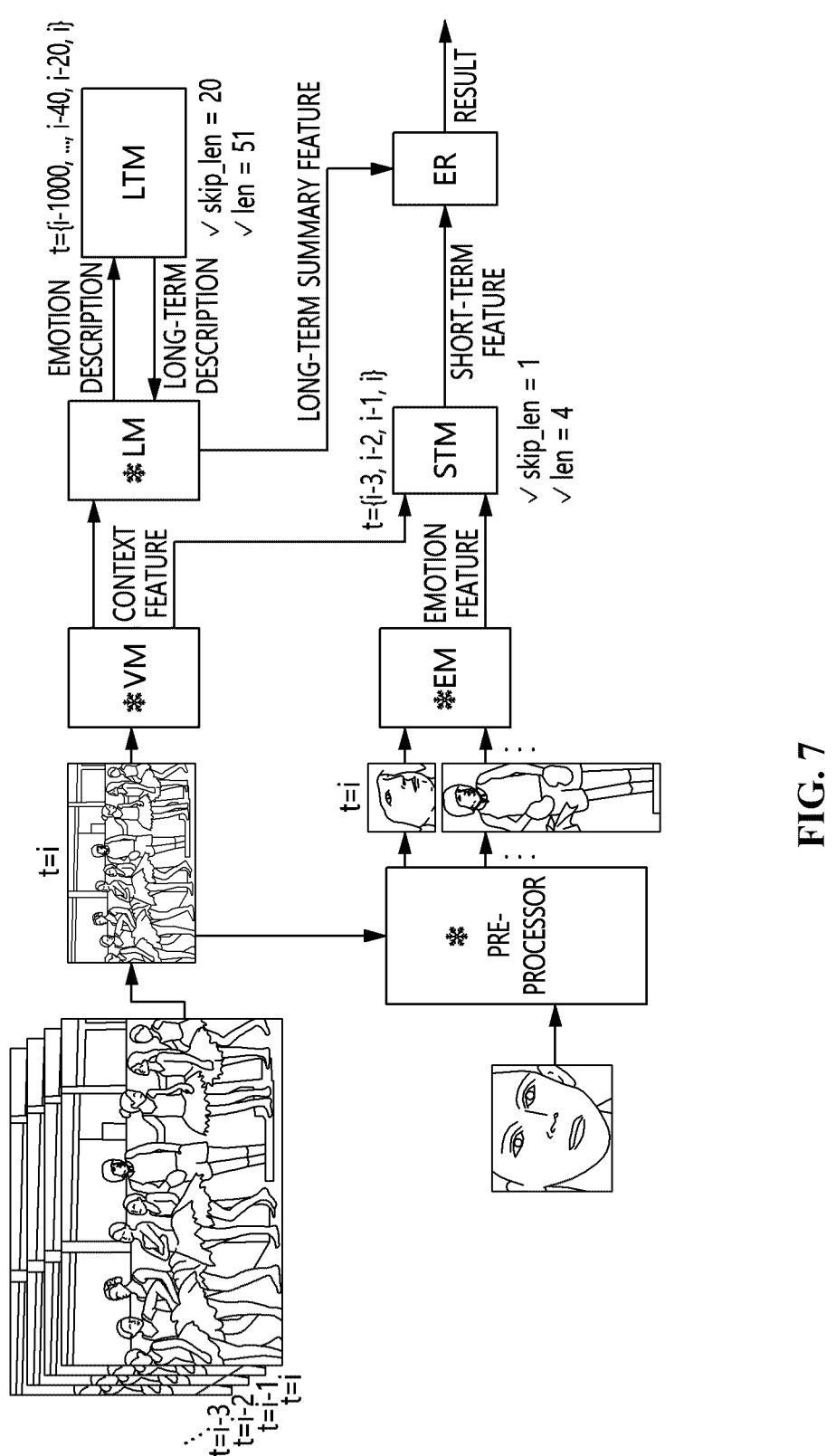
FIG. 7 illustrates an embodiment of training of an emotion recognizer (ER)

FIG. 7 illustrates an embodiment of training of an emotion recognizer (ER).

Referring to FIG. 7, in order to train the emotion recognizer (ER), all of other models are frozen (locked not to be trained), and the user parameters of long/short-term memory (LTM/STM) are fixed, after which training may be performed.

Further, in an embodiment for training, the emotion recognizer (ER) may be trained by pre-training models, other than the emotion recognizer (ER), and by collecting data and emotion annotations while the program is executed in a training mode for a certain period after the user sets parameters. In another embodiment, after both data and emotion annotations are collected in an offline mode, the emotion recognizer may be simultaneously trained with both the data and the emotion annotations.

In the preprocessor, the vision model (VM), the language model (LM), the emotion model (EM), and the emotion recognizer (ER), described above, may be trained and used through the above-described DNN, but other trainable algorithms may also be utilized. The long-term memory (LTM) may be implemented as nonvolatile storage which is capable of storing data even when the program is terminated. The short-term memory (STM) may be implemented as volatile storage such as RAM, but may also be implemented as nonvolatile storage. In this case, the log records of the short-term memory (STM) may also be checked even after the program is terminated.

Figure 8:
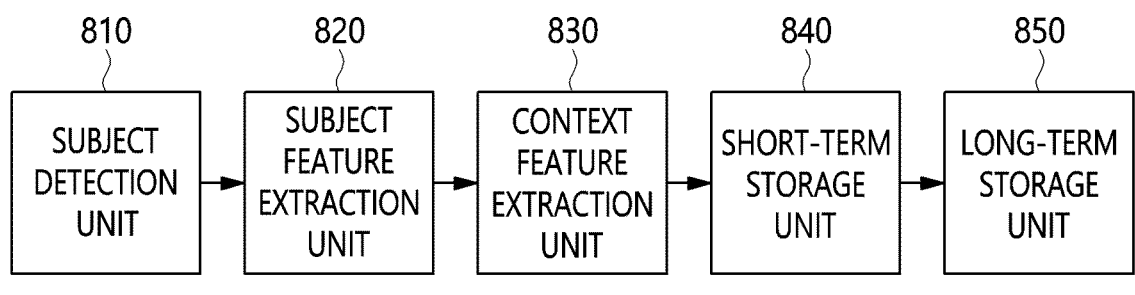
FIG. 8 is a block diagram illustrating an emotion recognition apparatus based on context information according to an embodiment of the present disclosure.

FIG. 8 is a block diagram illustrating an emotion recognition apparatus based on context information according to an embodiment of the present disclosure.

Referring to FIG. 8, the emotion recognition apparatus based on context information according to the embodiment of the present disclosure includes a subject detection unit 810 for detecting information corresponding to an emotion recognition subject from an input image, a subject feature extraction unit 820 for extracting recognition subject features based on the information corresponding to the emotion recognition subject, a context feature extraction unit 830 for extracting context features based on the input image, a short-term storage unit 840 for storing the recognition subject features and the context features, and a long-term storage unit 850 for storing the context features.

Here, the long-term storage unit 850 may store context text information generated based on the context features.

Here, the apparatus may further include an emotion recognition unit for recognizing the emotion of the emotion recognition subject based on the information stored in the short-term storage unit and the long-term storage unit.

Here, the emotion recognition unit may recognize the emotion using summary context information, which is generated using the context text information stored in the long-term storage unit, as input.

Here, the context text information may be generated by inputting the context features to a pre-trained language model.

Here, the information corresponding to the emotion recognition subject may include the face region of the emotion recognition subject, the full-body region of the emotion recognition subject, and the voice (speech) of the emotion recognition subject.

Here, the short-term storage unit 840 may store the recognition subject features and the context features at a first frequency for all frames of the input image.

Here, the long-term storage unit 850 may store the context text information at a second frequency lower than the first frequency for all frames of the input image.

Figure 9:
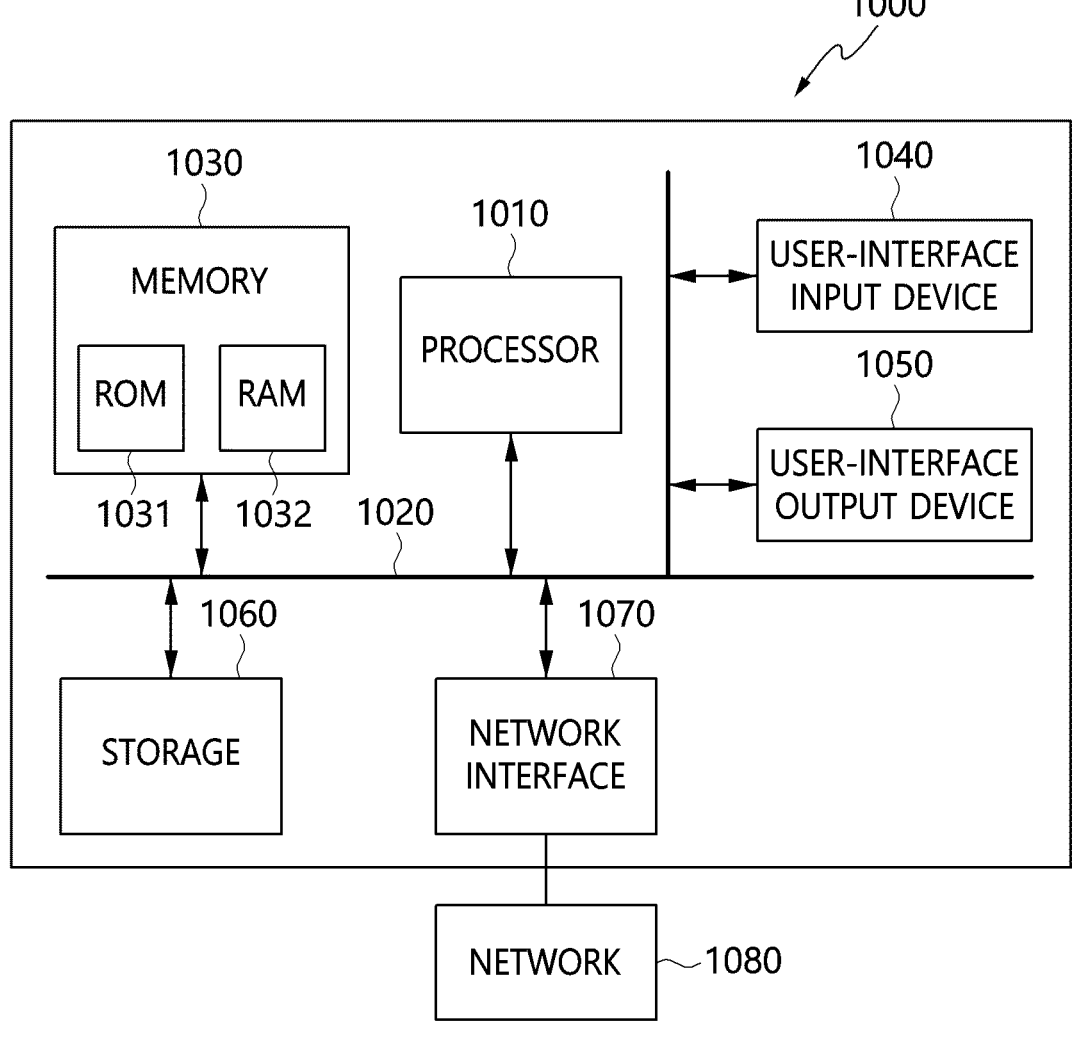
FIG. 9 is a diagram illustrating the configuration of a computer system according to an embodiment.

FIG. 9 is a diagram illustrating the configuration of a computer system according to an embodiment.

An emotion recognition apparatus based on context information according to an embodiment may be implemented in a computer system 1000 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, or an information delivery medium or a combination thereof. For example, the memory 1030 may include Read-Only Memory (ROM) 1031 or Random Access Memory (RAM) 1032.

Specific executions described in the present disclosure are embodiments, and the scope of the present disclosure is not limited to specific methods. For simplicity of the specification, descriptions of conventional electronic components, control systems, software, and other functional aspects of the systems may be omitted. As examples of connections of lines or connecting elements between the components illustrated in the drawings, functional connections and/or circuit connections are exemplified, and in actual devices, those connections may be replaced with other connections, or may be represented by additional functional connections, physical connections or circuit connections. Furthermore, unless definitely defined using the term "essential", "significantly" or the like, the corresponding component may not be an essential component required in order to apply the present disclosure.

According to the present disclosure, there can be provided the result of more accurate emotion recognition through context-aware emotion recognition.

Further, the present disclosure may efficiently store context information by utilizing long-term/short-term memory and to perform emotion recognition using the stored information.

Therefore, the spirit of the present disclosure should not be limitedly defined by the above-described embodiments, and it is appreciated that all ranges of the accompanying claims and equivalents thereof belong to the scope of the spirit of the present disclosure.

What is claimed is:

1. An emotion recognition method based on context information in a context-aware emotion recognition method, the emotion recognition method comprising:

detecting information corresponding to an emotion recognition subject from an input image;

extracting a recognition subject feature based on the information corresponding to the emotion recognition subject;

extracting a context feature based on the input image;

storing the recognition subject feature and the context feature in a short-term memory;

generating context text information representing the context feature in text; and recognizing an emotion of the emotion recognition subject based on information stored in the short-term memory and summary context information, wherein the summary context information is generated as a summary based on the generated context text information and long-term memory text information stored in a long-term memory.

2. The emotion recognition method of claim 1, wherein the context text information is generated by inputting the context feature to a pre-trained language model.

3. The emotion recognition method of claim 1, wherein the information corresponding to the emotion recognition subject includes a face region of the emotion recognition subject, a full-body region of the emotion recognition subject, and voice of the emotion recognition subject.

4. The emotion recognition method of claim 1, wherein the short-term memory stores the recognition subject feature and the context feature at a first frequency for all frames of the input image.

5. The emotion recognition method of claim 4, wherein the long-term memory stores the context text information at a second frequency lower than the first frequency for all frames of the input image.

6. An emotion recognition apparatus based on context information, comprising:

a controller configured to detect information corresponding to an emotion recognition subject from an input image, extract a recognition subject feature based on the information corresponding to the emotion recognition subject, extract a context feature based on the input image, and generate context text information representing the context feature in text;

a short-term storage unit configured to store the recognition subject feature and the context feature; and a long-term storage unit configured to store long-term memory text information, wherein the controller is configured to recognize an emotion of the emotion recognition subject based on information stored in the short-term memory and summary context information, wherein the summary context information is generated as a summary based on the generated context text information and the long-term memory text information.

7. The emotion recognition apparatus of claim 6, wherein the context text information is generated by inputting the context feature to a pre-trained language model.

8. The emotion recognition apparatus of claim 6, wherein the information corresponding to the emotion recognition subject includes a face region of the emotion recognition subject, a full-body region of the emotion recognition subject, and voice of the emotion recognition subject.

9. The emotion recognition apparatus of claim 6, wherein the short-term storage unit stores the recognition subject feature and the context feature at a first frequency for all frames of the input image.

10. The emotion recognition apparatus of claim 9, wherein the long-term storage unit stores the context text information at a second frequency lower than the first frequency for all frames of the input image.

* * * * *